(12) United States Patent
Bonicel

(10) Patent No.: US 6,614,970 B2
(45) Date of Patent: *Sep. 2, 2003

(54) CABLE HAVING A SUBSTANTIALLY GASTIGHT METAL TUBE RECEIVING AT LEAST ONE OPTICAL CONDUCTOR AND A HYDROGEN-ABSORBENT SUBSTANCE

(75) Inventor: Jean-Pierre Bonicel, Rueil Malmaison (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,237

(22) Filed: Jan. 26, 1999

(65) Prior Publication Data

US 2003/0007756 A1 Jan. 9, 2003

(30) Foreign Application Priority Data

Jan. 26, 1998 (FR) .............................. 98 00770

(51) Int. Cl.[7] ................................ G02B 6/44
(52) U.S. Cl. ................ 385/109; 385/100; 385/105
(58) Field of Search ................ 385/101, 102, 385/103, 104, 105, 106, 107, 108, 109, 110, 111, 112, 113, 141, 147

(56) References Cited

U.S. PATENT DOCUMENTS

| | | | |
|---|---|---|---|
| 4,715,678 A | | 12/1987 | Johnson et al. |
| 4,717,236 A | * | 1/1988 | Dewing ........................ 385/100 |
| 4,725,123 A | | 2/1988 | Aneli et al. |
| 4,741,592 A | | 5/1988 | Secco et al. |
| 5,136,673 A | * | 8/1992 | Yoshizawa et al. .......... 385/103 |
| 5,140,664 A | * | 8/1992 | Bosisio et al. ............... 385/109 |
| 5,455,881 A | * | 10/1995 | Bosisio et al. ............... 385/100 |
| 5,619,606 A | * | 4/1997 | Bonicel ....................... 385/102 |

FOREIGN PATENT DOCUMENTS

| | | |
|---|---|---|
| EP | 0 632 301 A1 | 1/1995 |
| GB | 2 172 410 A | 9/1986 |
| JP | 61-70712 | 12/1986 |

* cited by examiner

*Primary Examiner*—Frank G. Font
*Assistant Examiner*—Sang H. Nguyen
(74) *Attorney, Agent, or Firm*—Sughrue Mion, PLLC

(57) ABSTRACT

The invention relates to a cable having a substantially gastight metal tube receiving at least one optical conductor and a hydrogen-absorbent substance. The inside face of the tube is covered with a layer of a catalyst substance such as nickel or chromium for catalyzing the reaction whereby the hydrogen-absorbent substance absorbs hydrogen. Said layer is itself covered with at least one layer of hydrogen-absorbent substance which constitutes a filler material for filling the tube, or which merely forms a layer deposited on the layer of catalyst substance.

14 Claims, 1 Drawing Sheet

CABLE HAVING A SUBSTANTIALLY GASTIGHT METAL TUBE RECEIVING AT LEAST ONE OPTICAL CONDUCTOR AND A HYDROGEN-ABSORBENT SUBSTANCE

The invention relates to a cable having a substantially gastight metal tube receiving one or more optical conductors and a hydrogen-absorbent substance.

BACKGROUND OF THE INVENTION

Optical conductors are in common use in the field of telecommunications. Data is generally conveyed optically at a wavelength of approximately 1300 nanometers or 1550 nanometers by optical fibers based on silica. Each fiber is protected by layers of a polymer material, and the protective layers are often covered with some other, pigmented, polymer.

A set of optical fibers can be assembled to form a ribbon. In which case, the material of the ribbon is also a polymer.

The individual optical fibers or the ribbon of optical fibers are disposed in a metal tube or in a plastics tube.

It is known that optical fibers must not be exposed to hydrogen because that gas degrades their transmission properties and possibly also their mechanical properties. The higher the partial pressure of hydrogen to which the fiber is subjected, the greater the degradation.

The hydrogen comes in particular from decomposition of the polymers constituting the coverings of the fibers or the material for assembling the fibers together into a ribbon. It can also come from decomposition of the filler material that is generally provided in the tube to hold the fibers in the tube and to prevent moisture from travelling in the event that the tube is punctured or degraded.

Such decomposition occurs naturally because of ageing.

When the tube is made of a plastics material, the permeability of the material enables hydrogen to be diffused. When the tube is made of metal or of some other non-porous material, hydrogen remains confined inside the tube, and the optical properties of the fibers are thus progressively degraded.

To solve that problem, one solution consists in using a tube made of stainless steel so as to avoid giving rise to hydrogen-generating corrosion, and in providing a filler material that has hydrogen-absorbent properties. For example, the filler material may be a polymer, in particular an unsaturated polymer with which a catalyst such as palladium is generally mixed.

Stainless steel and such a mixture of a polymer with a catalyst constitute materials that are costly.

OBJECTS AND SUMMARY OF THE INVENTION

The invention remedies that drawback. It makes it possible to omit stainless steel and such a polymer mixture.

In the invention, the inside face of the metal tube of the cable is covered, at least in part and preferably substantially totally, with a layer of a catalyst substance facilitating hydrogen absorption by the substance provided for this purpose, said layer itself being covered, at least in part and preferably substantially totally, with at least one layer of the hydrogen-absorbent substance. In an embodiment, the hydrogen-absorbent substance constitutes the filler material. In another embodiment, the hydrogen-absorbent substance forms merely a layer in contact with the catalyst.

The invention results from the observation that it is not essential to mix the catalyst with the hydrogen-absorbent substance which is generally organic. It is merely necessary to deposit the catalyst in contact with the hydrogen-absorbent substance, the most suitable place being the inside surface of the tube. With such a configuration, the catalyzing effect is, in principle, less effective that when the catalyst is mixed with the filler material because, with the invention, the specific surface area of the catalyst that is in contact with the hydrogen-absorbent substance is smaller than the corresponding specific surface area when the catalyst is mixed with the filler material. Nevertheless, it has been observed that, in spite of this handicap, the hydrogen absorption effect remains satisfactory.

However, it is possible to increase to the specific surface area in contact with the hydrogen-absorbent substance, i.e. to increase the effectiveness of the catalysis, by imparting a selected amount of roughness to the surface of the catalyst. For example, this may be achieved by spraying on the catalyst in granular form, or by providing grooves, in particular longitudinal grooves, in the surface of the catalyst.

The tube can be manufactured from a metal strip whose inside surface is covered with the catalyst substance, the strip being subjected to forming so as to impart the shape of a tube to it, the longitudinal edges of the strip of metal being welded together once the optical conductors and the filler material have been fed into the formed tube.

In a variant, instead of welding the edges together, one longitudinal margin of the metal strip is applied against the other longitudinal margin and the two margins are glued together. When the hydrogen-absorbent substance constitutes a layer in contact with the catalyst, the gluing may be achieved by means of said layer which may be constituted by copolymers, for example. With this variant, the tube is less gastight than when it is welded. However, the leakage is insufficient to enable hydrogen to escape naturally, and it is therefore necessary to provide hydrogen-absorbent substance. But, in this case, the hydrogen absorption need not be as effective as when the tube is gastight.

The catalyst is preferably chosen such that it protects the metal tube against corrosion. Thus, it is not necessary to use stainless steel. It is also possible to cover the outside surface of the tube with the same material as that covering its inside surface.

In an embodiment, the metal tube is made of steel, in particular mild steel, and the covering on the inside of the tube is made of nickel and/or of chromium which performs the combined functions of catalyst and of protective covering for protecting the steel against corrosion. In which case, it is advantageous to nickel plate and/or to chromium plate both faces (inside and outside) so as to protect the tube fully against corrosion.

For example, the hydrogen-absorbent substance may contain a polymer which is chosen from the group formed by ethylene vinyl acetate (EVA) and by ethylene ethyl acrylate (EEA). For example, it may be advantageous to choose as the metal for making the tube a commercially available steel, in particular a mild steel, covered with a metal layer e.g. of nickel and/or of chromium, itself covered with a layer of a polymer such as EVA and/or EEA, which layer of polymer may advantageously be used to enable the tube to be glued together when it is formed.

The hydrogen-absorbent substance contains an organic material which is preferably a polymer that has double bonds (dienes) which open in the presence of the catalyst and which facilitate fixing the hydrogen on the open double bonds. The advantage with this type of polymer is that no water is produced by hydrogen being transformed into water which is trapped in the cable, in particular when the cable is substantially hermetically gastight, and thus the risk of optical fiber fatigue in the presence of water is smaller. For example, the filler material may be based on silicone or on a polyolefin, and, in the latter case, it is a polybutadiene or a polyethylene glycol or a combination of these two substances.

When the hydrogen-absorbent substance is based on a polymer, it is possible to use as the catalyst at least one of the metals in the platinum class, i.e. one of the elements in group VIII, periods 4, 5, and 6, of the periodic table of the elements, and preferably, in addition to nickel: cobalt, palladium, and chromium.

BRIEF DESCRIPTION OF THE DRAWINGS

Other characteristics and advantages of the invention appear from the following description of some of its embodiments, given with reference to the accompanying drawings, in which.

MORE DETAILED DESCRIPTION

Figure 1:
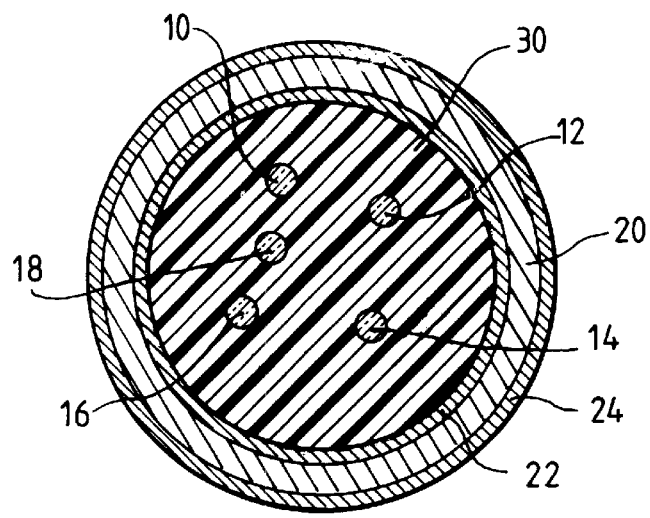
FIG. 1 is a diagrammatic section of a variant of a cable of the invention.

The cable shown in FIG. 1 contains a plurality of optical fibers 10, 12, 14, 16, and 18 disposed inside a mild steel tube 20 whose inside face is covered with a layer 22 of nickel and/or of chromium. Its thickness is unimportant. However, for practical manufacturing reasons, it is preferable for the thickness of the layer of catalyst to be at least 1 micron. The outside surface of the tube 20 is also covered with a protective layer 24, likewise of nickel and/or of chromium.

Figure 2:
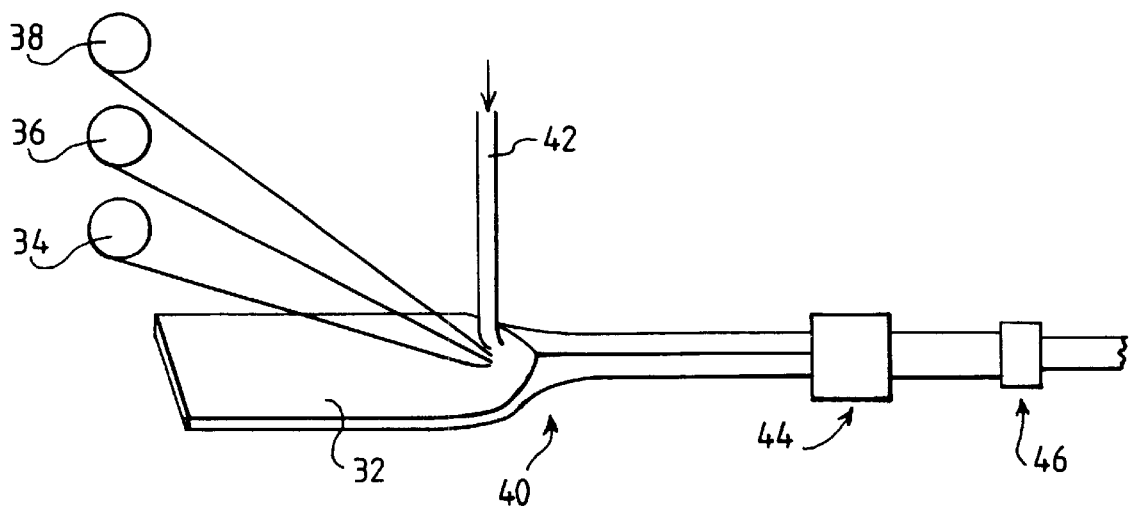
FIG. 2 is a diagram showing a method of manufacturing said cable of the invention.

The carbon content of the steel from which the tube 20 is made is determined so as to obtain hardness that makes it possible firstly to form the tube, as described with reference to FIG. 2, and secondly to impart the strength required for this type of cable.

The tube 20 is filled with a filler material 30 in which the optical fibers 10 to 18 are embedded. The filler material serves firstly to prevent water from travelling inside the tube in the event that the tube has an accidental leak, and secondly to constitute an absorbent substance that absorbs hydrogen. The nickel and/or the chromium forming a layer 22 covering the inside surface of the tube 20 constitute(s) a catalyst for the reaction whereby hydrogen is absorbed by the absorbent substance 30.

For example, the absorbent substance may be based on silicone or on a polyolefin. In the latter case, it may be a polybutadiene or a polyethylene glycol, or a combination of these two substances. Generally, the filler material has double bonds (dienes) which open in the presence of a catalyst and which facilitate the fixation of hydrogen on the open double bonds. For the filler material, it is also possible to use an unsaturated polymer chosen from unsaturated homopolymers obtained by polymerizing monomers chosen from butadiene, pentadiene, methylbutadiene, and chloro-2-butadiene. It is also possible to choose unsaturated copolymers or terpolymers obtained by polymerizing a first monomer, chosen from butadiene, pentadiene, methylbutadiene and chloro-2-butadiene, and a second and/or a third monomer chosen from styrene, vinyl-4-pyridine and acrylonitrile. It is also possible to choose unsaturated polymers obtained by grafting monomers onto unsaturated homopolymers or unsaturated copolymers or terpolymers, which monomers contain at least one unsaturated group chosen from vinyl, allyl, and mixtures thereof; the monomers contain at least one unsaturated group after the grafting step.

When the absorbent substance is based on silicone, it is possible to use an organic compound of the saturated silicone type corresponding to the following general formula:

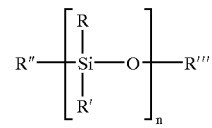

In this formula, R and R' may be identical or different, and they represent alkyl, alkenyl or aryl groups; R'" and R'" may be identical or different and they represent alkenyl groups; an n is an integer. In the above formula, it is possible to choose R and R' from among saturated or unsaturated aliphatic radicals, and aromatic radicals; in which case, R'" and R'" are unsaturated aliphatic radicals.

The hydrogen-absorbent substance may also be based on a metal oxide, as described in French Patent Application FR-A-2 588 388.

To make the tube shown in FIG. 1, it is possible to proceed as described below with reference to FIG. 2.

The tube 20 is formed from a strip 32 of mild steel which is nickel-plated and/or chromium-plated on both of its faces, and over which reels 34, 36, 38 of optical fibers are paid out. The strip 32 is formed into a tube 20 at a station 40. The filler material is fed into the tube at the forming station 40. The filling means are represented symbolically on the drawing by a pipe 42.

Downstream from the forming station 40, a welding station 44 is provided, e.g. a station for performing electrical welding or hot laser welding so as to weld together the longitudinal edges of the strip 32 after it has been formed.

Downstream from the welding station 44, a tube-swaging station 46 is provided. The cable is fully finished after this swaging station.

In a variant, the hydrogen-absorbent substance forms a layer deposited on the catalyst layer. In which case, it is not essential for the filler material, which serves to prevent moisture travelling inside the cable, to have hydrogen-absorbing properties itself. In this variant, it is also possible to take advantage of the adhesive properties of the substance making up the hydrogen-absorbent layer so as to avoid having to weld together the longitudinal edges of the metal strip. In which case, the margins of the strip merely need to be mutually overlapped.

Figure 3:
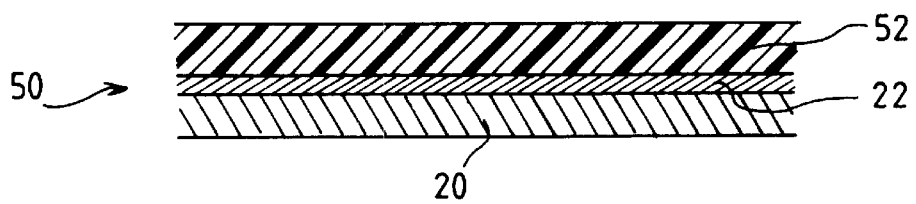
FIG. 3 is a diagram of a strip serving to manufacture another variant of a cable of the invention.

FIG. 3 shows a strip 50 comprising the metal strip proper 20, and a layer 22 of nickel and/or of chromium forming a catalyst on one face of the metal strip, and a layer 52 of hydrogen-absorbent substance deposited on the layer 22 of catalyst. For example, the layer 52 may be made of a polymer such as EVA and/or EEA, which may advantageously enable the tube to be glued together when it is formed.

Regardless of the embodiment, it is advantageous to maximize the specific surface area of the catalyst that is in contact with the hydrogen-absorbent substance. For this purpose, the layer 22 of catalyst preferably has a rough surface. For example, the roughness may be obtained by spraying nickel and/or chromium in powder form onto the metal surface, or by providing grooves, in particular longitudinal grooves in the layer of catalyst.

What is claimed is:

1. A cable having a substantially gastight metal tube which receives at least one optical conductor, said cable comprising:
   a first layer consisting essentially of a catalyst substance having a first side which covers and contacts, at least in part, an inside face of the tube, said first layer not being able to absorb hydrogen; and
   a second layer consisting essentially of a hydrogen-absorbent substance which covers, at least in part, a second side of said layer of said catalyst substance, wherein said second side is opposite said first side, said second layer not containing a catalyst substance,
   wherein said hydrogen-absorbent substance absorbs hydrogen.

2. A cable according to claim 1, in which the layer of catalyst substance is rough.

3. A cable according to claim 2, in which the layer of catalyst substance is provided with grooves.

4. A cable according to claim 1, further comprising a protective layer disposed over at least a portion of an outer surface of the tube, said protective layer serves to protect the tube against corrosion, wherein said protective layer substantially comprises the same catalyst substance as that of said layer of said catalyst substance present on the inside face of the tube.

5. A cable according to claim 1, in which the hydrogen-absorbent substance comprises at least one polymer.

6. A cable according to claim 5, in which said polymer is chosen from the group formed by ethylene vinyl acetate and by ethylene ethyl acrylate.

7. A cable according to claim 5, in which said polymer has double bonds which open in the presence of the catalyst so as to fix hydrogen on the open double bonds.

8. A cable according to claim 1, in which the catalyst comprises an element from group VIII, periods 4, 5, and 6, of the periodic table of the elements.

9. A cable according to claim 8, in which the catalyst comprises nickel or chromium.

10. A cable according to claim 1, in which the gastight tube is made of mild steel.

11. A cable according to claim 1, in which the hydrogen-absorbent substance constitutes a filler material for filling the tube.

12. A cable according to claim 1, in which the hydrogen-absorbent substance forms merely a layer deposited on the layer of catalyst substance.

13. A cable according to claim 12, in which the layer of hydrogen-absorbent substance has adhesive properties.

14. A cable having a substantially gastight metal tube which receives at least one optical conductor, said cable comprising:
   a first layer consisting essentially of a catalyst substance having a first side which covers and contacts, at least in part, an inside face of the tube, said first layer not being able to absorb hydrogen; and
   a filler consisting essentially of a hydrogen absorbent substance which covers, at least in part, a second side of said layer of said catalyst substance, wherein said second side is opposite said first side, said filler not containing a catalyst substance.

* * * * *